United States Patent [19]
Henley

[11] Patent Number: 5,350,137
[45] Date of Patent: Sep. 27, 1994

[54] MULTIPLE APPLICATION PARABOLOID SPACECRAFT STRUCTURE

[75] Inventor: Mark W. Henley, San Diego, Calif.

[73] Assignee: General Dynamics Corporation Space Systems Division, San Diego, Calif.

[21] Appl. No.: 64,389

[22] Filed: May 19, 1993

[51] Int. Cl.⁵ .............................. B64G 1/22; B64G 1/64
[52] U.S. Cl. ................................... 244/158 R; 244/63
[58] Field of Search ....................... 244/158 R, 173, 63

[56] References Cited

U.S. PATENT DOCUMENTS

| | | | |
|---|---|---|---|
| 5,052,640 | 10/1991 | Chang | 244/158 R |
| 5,178,347 | 1/1993 | Johnson et al. | 244/158 R |
| 5,203,844 | 4/1993 | Leonard | 244/158 R |
| 5,217,188 | 6/1993 | Thole et al. | 244/158 R |
| 5,242,135 | 9/1993 | Scott | 244/158 R |

*Primary Examiner*—Michael S. Huppert
*Assistant Examiner*—Virna Lissi Ansley
*Attorney, Agent, or Firm*—Frank D. Gilliam; John R. Duncan

[57] ABSTRACT

A combined application paraboloid spacecraft structure that is adapted to serve as a structural element for space transportation vehicles, and in additional applications, as a separated spacecraft. The primary structure of the combined application paraboloid spacecraft structure is shaped as the shell of a paraboloid of revolution which has focusing properties for use in such functions as a solar power concentrator, a surveillance or an astronomical telescope, or a communications antenna when deployed in space. The primary structure of this combined application paraboloid can nest and can also be used to support other single or multiple host spacecraft during launch and orbit to orbit transportation. The convex side of the combined application paraboloid primary structure is designed to receive and support auxiliary equipment for combined application paraboloid spacecraft and space transportation vehicles, such as command and control equipment, communications equipment, thrusters, power supplies, and solar power collector panels.

The multiple application spacecraft may be employed with a single host spacecraft or a plurality of host spacecraft, or a plurality of such multiple application paraboloid spacecraft may be nested together in a self supporting/protecting stack for launch. The primary structure may also be employed itself as a protective fairing or other aerothermodynamic shield, or in a support function for equipment carried on space transportation vehicles.

16 Claims, 2 Drawing Sheets

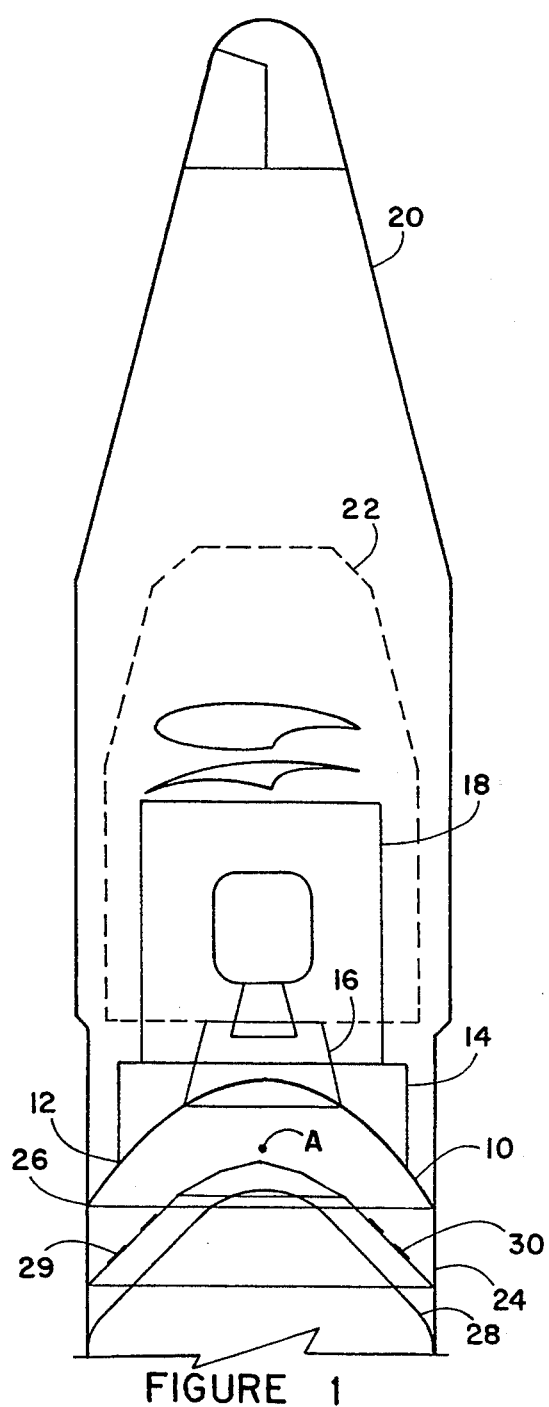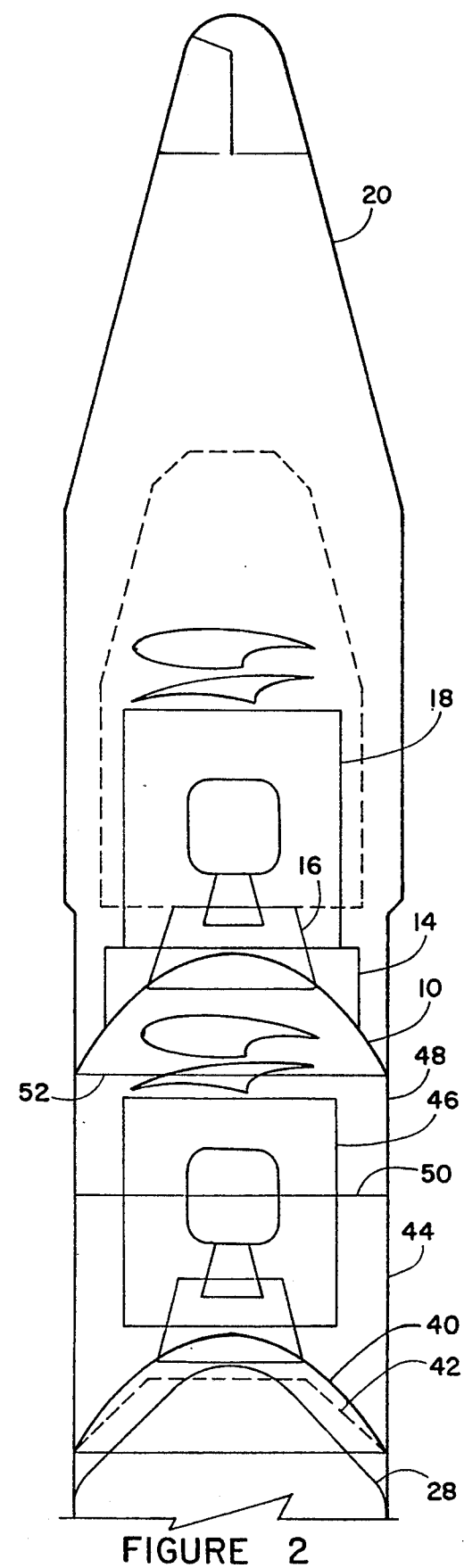

MULTIPLE APPLICATION PARABOLOID SPACECRAFT STRUCTURE

BACKGROUND OF THE INVENTION

The present invention relates to an improvement in spacecraft structure and more particularly, but not by way of limitation, to a multiple-purpose spacecraft having a parabolic primary structure for uses such as an antenna or solar power concentrator and being adapted to serve other uses such a fairing, equipment modules, or adapter during a space transportation sequence in either launch or orbit to orbit transportation.

In U.S. Pat. No. 5,178,347 a method and apparatus for launching a capsule into a lower orbit in conjunction with the launch of a satellite into a higher energy orbit is disclosed. The capsule is located in the launch vehicle so that, at burnout of the next-to-last stage of the launch vehicle, the attitude and velocity of the last stage capsule and satellite are sufficient to correspond to a desired orbit for the capsule. The capsule is released before ignition of the last stage during the ballistic phase of flight between the next-to-last stage and the last stage. After release of the capsule, the last stage is ignited permitting the satellite to be placed in the desired higher energy orbit.

One example of this approach is a capsule carried under a satellite in the upper part of the European launcher ARIANE 4's dual payload launch structure which is called SPELDA (ARIANE 4 External Carrying Structure for Double Launching). After the ARIANE 4 has brought the SPELDA to orbit, the upper satellite is separated and the upper half of the SPELDA is jettisoned to become space debris, and a second spacecraft is separated from within the lower half of SPELDA. ARIANESPACE, the organization responsible for ARIANE 4 launches, has proposed attachment of an ARTEM (ARIANE Technology Experiment Platform) to the upper half of SPELDA for use following the jettison event.

U.S. Pat. No. 5,178,347 also contemplates the use of an ARIANE 5 launcher carrying a capsule under a satellite in a SPELTRA (ARIANE 5 External Carrying Structure for Triple Launching). After the ARIANE 5 launcher has carried the SPELTRA to a desired orbit the capsule is separated for operation in a desired orbit. The next stage launcher is then shifted away from the location of the capsule and the SPELTRA is then jettisoned for transfer of the satellite to another orbit by the second stage of the launch vehicle.

The aforementioned arrangements are concerned with slewing of the launched vehicle so as to release the capsule in a predetermined direction apart from the launch direction so as to obtain a desired amount of separation between the capsule and the last stage prior to ignition of the last stage. They are not concerned with providing a spacecraft structure which can be carried by a launch vehicle with little or no penalty to launch mass and payload volume while providing multiple applications.

It is a general object of this invention to provide a spacecraft having a paraboloid structure which serves more than one purpose.

It is a further general object of this invention to provide a spacecraft having a paraboloid primary structure that is used to support and shield a payload during launch and thereafter, to separate from the upper stage of the launch vehicle for use in a multiple of applications.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates a multiple application spacecraft that is provided with a primary structure having an open paraboloid shape. Auxiliary equipment such as command and control equipment, communications equipment, thrusters, fuel cells, and solar power panels are secured to the convex side of the primary structure. The multiple application spacecraft is arranged to nest with a host spacecraft within a separable fairing atop a launch vehicle and cooperate with an adapter to support and protect the host spacecraft, During the launch sequence, the protective fairing is separated from the launch vehicle to uncover the host spacecraft and the multiple application spacecraft. Upon reaching the desired orbit, the host spacecraft is separated from cooperation with the multiple application spacecraft, which is then deployed for performing further functions. The paraboloid shaped primary structure may then perform other functions, such as a communications antenna, a surveillance or astronomical telescope, or a solar power concentrator, for example.

A plurality of such multiple application spacecraft may be employed in a dual launch of host spacecraft. Further, a plurality of multiple application spacecraft may be nested and stacked together atop a launch vehicle for positioning in a desired orbit. Upon jettisoning of an outer fairing and separation of cylindrical support structure or fairings interposed between each pair of multiple application spacecraft, the spacecraft may be individually deployed to separate positions for performing desired separate functions. The described applications are intended to be only illustrative of the many applications for which the subject spacecraft may be favorably employed. Since the spacecraft offers a large aperture and sturdy support structure which is used initially as a space transportation vehicle structure, it may be employed with little or no penalty to launch mass and payload volume. The primary structure may also be used by itself alone as a payload fairing or other shielding and support structure. The concave side of the combined application paraboloid also may have equipment attached to it. Such an application could be useful in gaining access to the focus of the paraboloid or in use as an aero fairing, for example for Mars probes similar to those planned for NASA's MESUR (Mars Environmental Survey) missions.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a diagrammatic view that shows a launching configuration for putting a host spacecraft and a multiple application paraboloid spacecraft constructed in accordance with the present invention into desired orbits;

FIG. 2 is a diagrammatic view that shows a second launching configuration for providing a dual launch of host spacecraft and a plurality of the multiple application spacecraft;

Similar numerals refer to similar parts in all FIGURES.

DETAILED DESCRIPTION OF THE INVENTION

Figure 3:
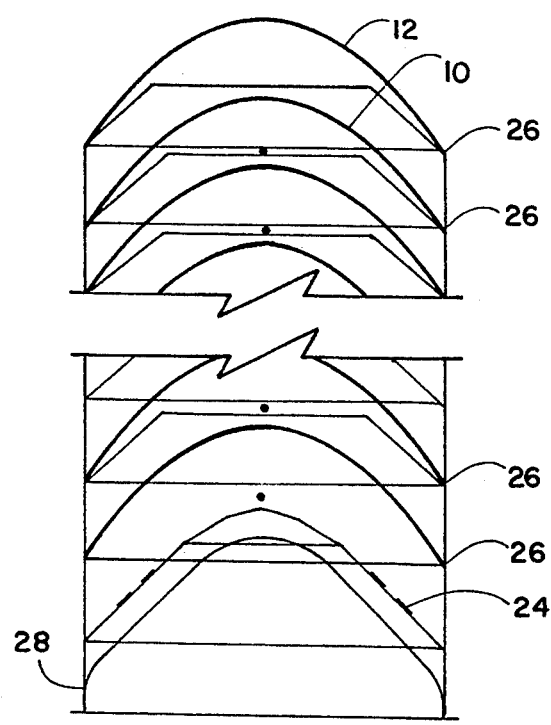
FIG. 3 is a diagrammatic view that shows a third launching configuration for putting a plurality of the multiple application spacecraft into orbit.

Referring now to the drawings in detail and in particular to FIG. 1, reference character 10 generally designates a multiple application spacecraft that has been constructed in accordance with a preferred embodiment of the invention. The spacecraft 10 includes a primary structure 12 that is provided with an open ended paraboloid shape having a large aperture having a focus at point A. The side of the primary structure 12 opposing the open ended side is adapted to receive auxiliary equipment that is particularly suited for the particular mission identified for the spacecraft 10. The area available for such auxiliary equipment is shown by reference character 14.

The spacecraft 10 cooperates with a standard adapter 16 to protect and support a host spacecraft 18 which is received within a separable fairing 20, which in the instance of the DELTA II vehicle, has an interior envelope opening as shown in dotted outline by reference character 22. The fairing 20 is removably secured to a supporting cylinder 24 at connection 26 by a separation device such as the pyrotechnic separation systems developed for the CENTAUR vehicle or the marman clamp separation systems for current ATLAS payloads. The supporting cylinder 24 is attached to a suitable space transportation vehicle 28 that is protected by a fairing 30 which contains the forward equipment module comprising the rocket's guidance and control electronics.

The space transportation vehicle 28 may include an ATLAS I booster which weighs about 360,000 pounds at lift off and which sheds various parts during its ascent until it falls away altogether about $4\frac{1}{2}$ minutes into the mission. The CENTAUR upper stage then takes over and positions itself in space and then releases its payload into a desired orbit. Accordingly, the space transportation vehicle 28 is considered a suitable launch vehicle having a plurality of stages as required for a particular mission or a suitable future vehicle for transportation between one orbit and another.

Figure 4:
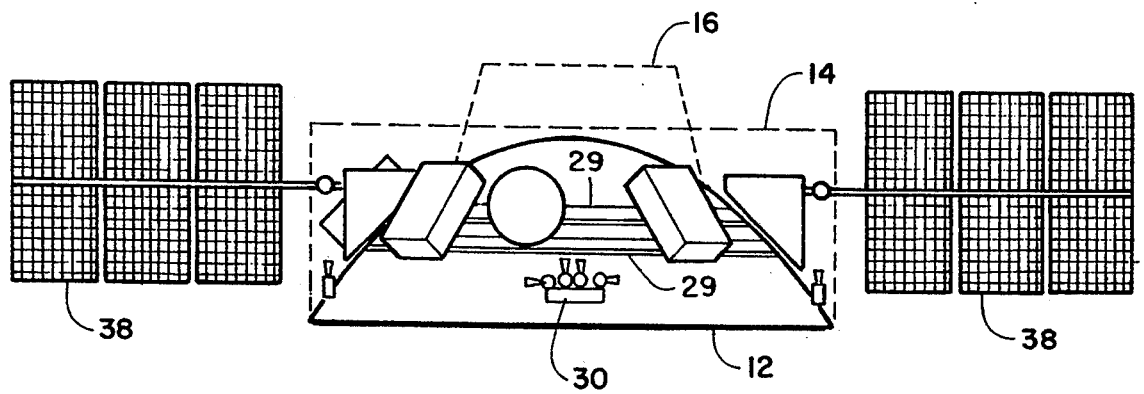
FIG. 4 is a perspective of the subject spacecraft when deployed for one application.
Figure 5:
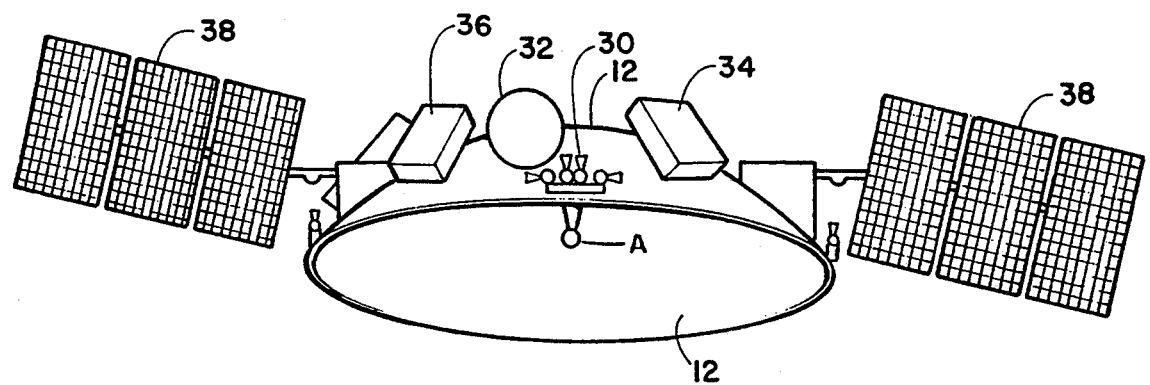
FIG. 5 is another perspective of the subject spacecraft seen in FIG. 4 for further illustrating the auxiliary equipment carried by the spacecraft.

Referring now to FIGS. 4 and 5, the primary structure 12 of the spacecraft 10 is seen as configured to act as a communications antenna. The primary structure 12 is provided with equipment mounting rails 29 on the convex side of the paraboloid-shaped structure, which supports auxiliary equipment such as propellant tanks 32, command and control/communications equipment 34 and electrical/power storage equipment 36, all as is well known in the art.

In the particular application shown in FIGS. 4 and 5, the spacecraft 10 is provided with reaction control systems 30 and with solar cell panels 38 that have been deployed after the spacecraft 10 has been placed in orbit for purposes of providing electrical power to the spacecraft 10. For transmitting and receiving communications signals, a deployable rigid structure to place equipment at the focus A of the paraboloid.

The primary structure 10 may be fabricated to advantage from advanced composites which may be provided by automated techniques such as filament or tape winding on a suitable mandrel or by automated material deposition by a tape laying head within a bond tool. The carbon fiber reinforced resin matrix advanced composites provide the advantage of high strength and low weight and mass, as well as providing precise focusing due to low thermal expansion. However, light weight metals could also be used for this application. While the illustrated application of the spacecraft 10 is to be a communications antenna, the spacecraft 10 may be used for a myriad of other applications such as a solar power concentrator or as a surveillance or astronomical telescope. Also, the primary structure 12 may be used by itself for many other space applications.

Turning now to FIG. 2, other applications of the spacecraft 10 are illustrated. Here the space transportation vehicle 28 receives a spacecraft 40 which is derived from the spacecraft 10 and which uses the primary structure 12 as an equipment module of the space transportation vehicle 28. The outline of the equipment module 29 as employed in the configuration seen in FIG. 1 is illustrated by the dotted line 42. A supporting cylinder 42 is separably connected to the launch vehicle 28 and partially encloses a host spacecraft 46 which is supported on the spacecraft 40 by a standard adapter 16. Another supporting cylinder 48 is separably connected to the cylinder 44 by a separable connection 50 and by a separate separable connection 52 to a fairing 20.

A spacecraft 10 is positioned over the spacecraft 46 and receives a standard adapter 16 for cooperating with and supporting a host spacecraft 18 as previously illustrated in FIG. 1. Thus, FIG. 2 shows the instant invention to be used as the forward equipment module of the space transportation vehicle 28 and as a separable spacecraft that has been nested with two host spacecraft 18 and 46 for deployment in a desired orbit it space at a minimum penalty to launch mass and payload volume. This illustration has provided only one of the dual/multiple payload carrier configurations to which this invention pertains.

In FIG. 3 it will be seen how the novel spacecraft of the subject invention may be adapted easily for further applications. The space transportation vehicle 28 may be provided with a forward equipment module and fairing 29 as previously seen in FIG. 1. A plurality of spacecraft 10 are then nested and stacked together atop the space transportation vehicle 28 to provide a stack of self supporting and protecting spacecraft 10. The spacecraft 10 are separable from each other and from the space transportation vehicle 28 by a suitable separable connection 26 as previously described. A further application of the invention is seen as the primary structure 12 is employed as the aerothermodynamic fairing 52 of the nested and stacked spacecraft 10. Thus, due to the compactness which protects the spacecraft 10 a plurality of such spacecraft could be carried easily on one space transportation vehicle and then deployed in orbit for a plurality of applications or for common application in an array of spacecraft with similar or identical characteristics.

The foregoing has illustrated how the instant invention profitably uses mass that would otherwise be space debris to provide a multiple application spacecraft which may be used to support or shield a payload during launch. After launch, this structure may be separated from the upper stage of the launch vehicle to become part of a spacecraft that is well suited for a number of applications. The paraboloid shape of the primary structure of the invention makes it ideal for use in its first function of supporting and for shielding a payload during launch and its large aperture makes it suitable for many other applications.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A multiple purpose spacecraft arrangement that is adapted to be placed in orbit around the earth by a space transportation vehicle, which spacecraft comprises:
    a primary structure having an open paraboloid shape with a convex side and an opposite concave side having a focus whereby the primary structure may be used for a predetermined space application when placed into orbit by a space transportation vehicle;
    the primary structure having a suitable attitude control means secured on the surface of the structure of the convex side of the open-paraboloid shape for positioning of the spacecraft in orbit; and
    the primary structure also having a command and control system secured to the convex side for receiving signals for ordering the spacecraft to position itself in a predetermined orientation in orbit, and
    the primary structure having sufficient strength and rigidity to cooperate with an adapter for securing a payload of a space transportation vehicle.

2. A spacecraft arrangement as defined in claim 1 which also includes solar panel means that are secured to the convex side of the primary structure and which are deployable when the spacecraft has been positioned in a desired position in space.

3. A spacecraft arrangement as defined in claim 1 wherein the concave side of the open paraboloid shaped primary structure is adapted to be operated as a communications antenna.

4. A spacecraft arrangement as defined in claim 1 wherein the primary structure is adapted to be utilized as a telescope.

5. A spacecraft arrangement as defined in claim 1 wherein the concave side of the primary structure is adapted to be used as a power concentrator for incident radiation.

6. An arrangement for placing multiple spacecraft into desired orbits by a space transportation system, which arrangement comprises:
    at least one generally cylindrical host spacecraft adapted to be placed into a desired position in space by a space transportation vehicle;
    at least one other spacecraft which is provided with a primary structure having an open ended paraboloid shape with a convex side and an opposite concave side which is adapted for use as a concentrator for incident radiation upon deployment and for assisting in supporting the host spacecraft during the space transportation sequence;
    whereby the host spacecraft and the other spacecraft may be separated from each other for pursuit of their separate or integral missions.

7. The arrangement as defined in claim 6 wherein the other spacecraft is arranged to cooperate with an adapter means for separably securing and supporting the host spacecraft with the other spacecraft within a surrounding fairing during the space transportation sequence.

8. The arrangement as defined in claim 6 wherein a concave side of the open paraboloid-spaced primary structure of at least one other spacecraft is adapted to function as a communications antenna.

9. The arrangement as defined in claim 6 wherein the paraboloid-shaped primary structure of at least one other spacecraft is adapted to function as a telescope.

10. The arrangement as defined in claim 6 wherein at least two axially spaced generally cylindrical host spacecraft are carried by a space transportation vehicle with at least one other spacecraft being positioned between the two host spacecraft,
    and a secondary elongate fairing surround at least one host spacecraft and at least one other spacecraft and being separably secured to a first fairing surrounding the end of the assembly of spacecraft opposite and space transportation vehicle and to the space transportation vehicle.

11. An arrange for placing multiple purpose spacecraft into desired position in space for traversing the distance to a predetermined position in space, which arrangement comprises:
    a plurality of spacecraft releasably secured to the upper portion of a space transportation vehicle, each of the spacecraft having a primary structure that is provided with an open ended paraboloid shape having a convex side and an opposite concave side arranged to face the space transportation vehicle for use in a predetermined space application when placed in a predetermined position in space by the space transportation vehicle;

each of the spacecraft being provided with attitude control means on the convex side for controlled orienting of the spacecraft after separation from the space transportation vehicle;

each of the spacecraft also being provided with command and control means for communicating with earth and directing the positioning of the spacecraft for performance of the desired space function;

a separable supporting cylinder positioned at the forward end of the space transportation vehicle for supporting and protecting the spacecraft during launch, and a fairing releasably positioned on a forwardly facing side of the furthest spacecraft from the vehicle for protecting it during the launch.

12. The arrangement of claim 11 wherein the paraboloid spaced primary structure is adapted for use as a power concentrator for incident radiation.

13. The arrangement of claim 11 wherein the paraboloid shaped primary structure is adapted to function as a communications antenna.

14. The arrangement of claim 11 wherein the paraboloid shaped primary structure is adapted to function as a telescope.

15. The arrangement of claim 1 wherein a plurality of such spacecraft are serially and separably arranged on the space transportation vehicle with the concave side of the paraboloid primary structure of each facing the space transportation vehicle and the fairing separably arranged on the outermost spacecraft.

16. The arrangement of claim 15 wherein a separable cylindrical fairing is interposed between each adjacent pair of spacecraft for assisting in supporting such spacecraft during the launch sequence.

* * * * *